United States Patent [19]

Matweecha et al.

[11] Patent Number: 5,413,635
[45] Date of Patent: May 9, 1995

[54] LIME SLUDGE TREATMENT PROCESS

[75] Inventors: David M. Matweecha, Bethlehem; Charles R. Euston, Kutztown, both of Pa.

[73] Assignee: Fuller Company, Bethlehem, Pa.

[21] Appl. No.: 175,856

[22] Filed: Dec. 30, 1993

[51] Int. Cl.$^6$ .............................................. C04B 2/02
[52] U.S. Cl. ..................... 106/792; 423/168; 423/430; 106/756; 106/758; 106/761; 106/762
[58] Field of Search ............... 106/792, 756, 758, 761, 106/762; 423/430, DIG. 3, 168, 175; 432/14

[56] References Cited

U.S. PATENT DOCUMENTS

| | | | |
|---|---|---|---|
| Re. 21,633 | 11/1940 | Kaiser | 106/756 |
| 3,955,995 | 5/1976 | Touborg | 106/758 |
| 3,964,922 | 6/1976 | Nishida et al. | 106/756 |
| 4,002,420 | 1/1977 | Christiansen | 106/758 |
| 4,209,296 | 6/1980 | Deussner | 106/756 |
| 4,287,160 | 9/1981 | von Zander | 106/758 |
| 4,606,722 | 8/1986 | Olauson | 106/756 |

*Primary Examiner*—Mark L. Bell
*Assistant Examiner*—Michael Marcheschi
*Attorney, Agent, or Firm*—Daniel De Joseph

[57] ABSTRACT

Disclosed is a method and an apparatus for the heat treatment of lime sludge ($CaCO_3$) to form burnt lime (CaO). In the method of the present invention a lime sludge feed is entrained in and thereafter dried in a gas flash dryer means to produce a dried lime sludge. The dried lime sludge is separated from the gases and thereafter is fed to a rotary kiln in which the dried lime sludge is converted to active burnt lime. In order to maintain the flow of gas in the flash dryer means at a predetermined velocity in order to entrain all the lime sludge feed in the gas flow, an adjustable portion of the separated gases are recycled through the flash dryer means.

3 Claims, 1 Drawing Sheet

LIME SLUDGE TREATMENT PROCESS

The present invention relates to a method and apparatus for treating, generally known as "reburning", lime sludge (which is mainly CaCO3) in order to regenerate the sludge, which in a paper making method has been separated in connection with a causticizing process, to form active lime (CaO).

With regard to the paper industry, the preparation of pulp from wood is usually carried out by cooking the wood according to the sulphate or soda method.

During the cooking process, wood is charged together with a cooking liquid consisting of NaOH and Na2S (in the sulphate method), with the major portion of the lignin contents of the wood being dissolved. Thereafter the pulp formed in the cooking is purified by washing in a second step. In order to achieve a satisfactory quality the washed pulp is often treated by screening and bleaching with different bleaching chemicals.

After treatment the finished pulp is fed to a pulp dryer or directly to a paper mill.

The spent liquor derived from pulp washing contains dissolved wood substances and the chemicals charged in cooking. For recovery of these, the spent liquor is usually concentrated by evaporation of the major portion of its water contents in an evaporation plant, after which the spent liquor is burnt in a so-called recovery boiler where the chemicals charged are recovered in the form of Na2CO3 in a so-called green liquor. Depending on the choice of cooking method Na2S may also be found in the green liquor.

To make it possible to recycle the recovered chemicals in the cooking process the Na2CO3 contents of the green liquor must be converted into NaOH. This is usually carried out by treatment of the green liquor with burnt lime (CaO) in the causticizing reaction to form a so-called "white liquor" containing lime sludge according to the following reaction sequence:

Na2CO3+CaO+H2O→2NaOH+CaCO3

The lime sludge (CaCO3) formed is then converted into burnt lime (CaO) by so-called lime sludge reburning, which generally utilizes a lime sludge reburning rotary kiln, according to the following reaction sequence:

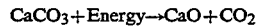

CaCO3+Energy→CaO+CO2

As indicated above this lime sludge reburning is usually carried out in rotary tubular lime sludge reburning kilns, into which lime sludge, which is typically dewatered to about 75% solids, is passed in counterflow to flue gases generated in the opposite end of the kiln, usually by combustion of oil or natural gas. The lime sludge undergoes the following reactions in sequence in the kiln: drying, heating and reburning, the temperature of emerging burnt lime generally being about 1900° F. to 2200° F.

Typically, lime sludge is dried in a kiln, generally in the chain section of the kiln prior to being "reburnt" further on in the kiln. In an alternative method that has been recently utilized, lime sludge is first dried, prior to being fed into a kiln, in a drying apparatus, such as a flash dryer, which is heated by off gases from the rotary kiln. Such flash dryers, which replace the chain portion of a kiln, generally have a portion which is vertically configured and are generally positioned above the kiln hood, i.e., the material entry point into the kiln. In a flash drying process, lime mud is fed into the vertical portion of the flash dryer at a material inlet where it comes in contact with and is entrained in an upwardly moving heated gas stream, which exited the lime kiln in counter-current direction to material flow within the kiln. The entrained mud is typically dried in the gas stream while being carried upward to a separator cyclone. Prior to the drying step, lime sludge is typically first "dewatered" in a lime filter after which it is fed to the flash dryer, and generally will have a moisture content when entering the flash dryer system in the range of 20% to 30%. Dried lime sludge from the flash dryer is thereafter separated from the drying gases in a cyclone, and is then fed into the lime kiln for reburning.

There are dangers to placing fresh lime mud directly into a flash dryer pursuant to the above process. For example, typically there can be upset conditions in the lime filter which may, even on a temporary basis, effect the nature of the feed into the flash dryer. When lime sludge having a larger than usual moisture content is introduced into the vertical portion of the flash dryer such sludge may be too heavy to be suspended in the upwardly moving gas stream and may therefore fall through the flash dryer and settle in the kiln hood. This may also occur if (for any of a number of reasons) the velocity of the lime kiln off gas flow falls beneath an suitable minimum level for realizing complete entrainment of feed. In the above instances, build up of undried feed material may occur within the kiln hood which will be detrimental, one reason being that it has been shown that an inconsistency in a kiln's feed is detrimental to the kiln's performance. It has been suggested that one method of addressing this problem is to place internal baffles within the flash dryer to vary the gas velocity past the feed inlet. This method is at times utilized in combination with scoop shaped extensions attached to the kiln located at the material entrance to the kiln which, when the kiln is rotated, serve to lift up the fallen material and feed it into the kiln.

The above-described method has a number of disadvantages. The scoops are items which require a high degree of fabrication and are therefore an expensive addition to a system. Moreover, even if the scoops are effective in moving the fallen feed into the kiln, the lime reburning process will suffer since the kiln will thereby be provided with feed having differing characteristics. Furthermore, there may be problems in precisely controlling the adjustment of the baffles to achieve the desired velocity of air flow past the feed inlet and, even if such baffles were working effectively, the off gas output from the kiln may be low such that the gases could never achieve a satisfactory velocity.

It would be advantageous, and it is an object of this invention, therefore, to achieve an improved method of reducing the drop off of lime mud into the kiln hood.

The above and other objects are realized by the present invention in which a controllable amount of air that has exited the flash dryer and has been separated from the dried lime sludge is recycled back into the vertical portion of the flash dryer below (i.e., upstream from relative to the gas flow) the feed inlet portion of the flash dryer. Using this method, the velocity of the air through the flash dryer, and more specifically at the feed inlet into the flash dryer, is maintained at a level sufficient to entrain all of the feed in the air stream. Most preferably, this method is utilized in combination with mixing a portion of the separated dried sludge with the fresh lime sludge feed in a mixing apparatus that is located between the lime filter and the material inlet to the flash dryer to thereby at least partially dry the fresh lime sludge prior to its insertion into the flash dryer.

BRIEF DESCRIPTION OF THE DRAWING

The invention is described closer below with reference to the accompanying FIGURE which is a schematic of, and is not drawn precisely to scale, of an exemplary apparatus and preferred method used for carrying out the present invention.

DETAILED DESCRIPTION OF THE DRAWING

Figure 1:
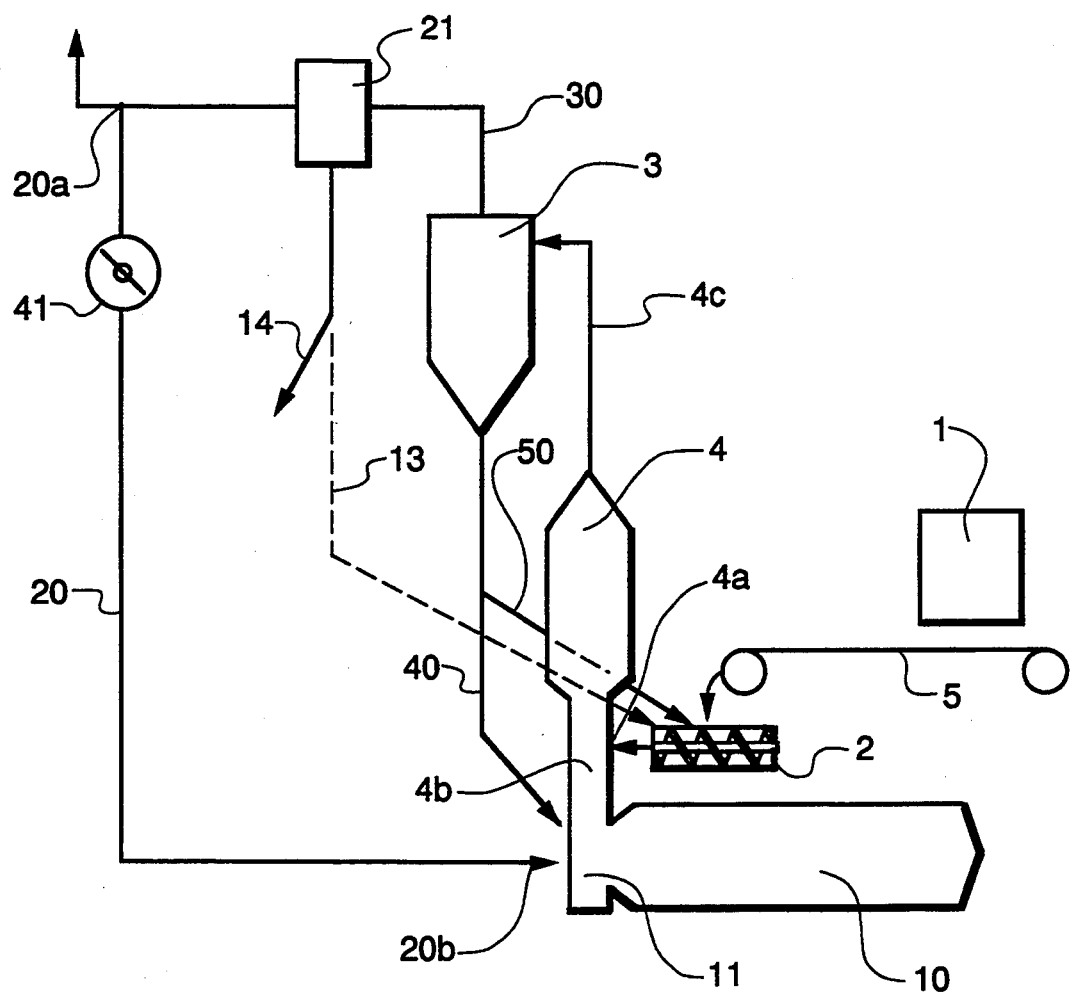

The FIGURE schematically illustrates the principle of the apparatus and the method of the present invention.

The apparatus and method of the present invention is utilized in conjunction with the known principle of treating lime sludge through the combination of predrying the sludge in a flash dryer and subsequently feeding it to a rotary kiln whereafter it is burnt to form CaO. The principle invention provides for a method in improving upon such a known process.

In the method of the present invention, fresh lime sludge, which typically has a water content of about 20% to about 30% (by weight) and is generally supplied from lime filter 1 is fed into flash dryer 4 via conduit 5 and material inlet 4a. Preferably, said lime sludge is first fed into mixer 2, which in the depicted embodiment is a screw mixer, wherein, in such an embodiment, fresh sludge is mixed with a minor portion of predried sludge (supplied from separation cyclone 3 (or from dust collector 21 as described below) via first material recycling conduit means 15), to produce a less moist feed, and is thereafter inserted into flash dryer 4 via material inlet 4a. Although a screw mixture is depicted in the FIGURE, it is understood that other mixers, such as pug mills or paddle mixers, may be utilized between the flash dryer inlet and the lime filter in place of the screw mixer for the same purpose.

As indicated, fresh lime sludge (or the optional lime sludge mixture of fresh lime sludge and dried lime sludge as discussed above) is fed into flash dryer 4. The material will typically be fed into the vertical portion 4b of flash dryer 4 where it will be entrained in a upwardly moving heated gas stream.

The interior of flash dryer 4 will typically have a temperature at which material is dried which ranges from about 250° F. to about 450° F. The gas utilized in the flash dryer 4 will of course consist in part of off gases (ranging in temperature from approximately 1000° F. to approximately 1300° F.) from rotary kiln 10, and, pursuant to the process of the present invention, will at times consist of recycled gases via recycle conduit 20, which recycle gases typically having a temperature that ranges from approximately 250° F. to approximately 450° F. The recycle gas has been separated from dried lime sludge in cyclone 3, and are recycled back into flash dryer 4 at a point located below material inlet 4a. In the depicted embodiment one end 20a of the recycle conduit for such gases is located downstream from dust collector 21, with its other end 20b being in communication with the kiln hood 11 and thereby with flash dryer 4. The recycle conduit will typically have located somewhere therein a damper means 41 which will be either manually or automatically controlled, and thereby the amount of recycle flow, and correspondingly the velocity of air to flash dryer 4 will be controlled, i.e., it will be adjustable. Ideally, the damper means will automatically be operatively connected, in a manner well known to those skilled in the art, with a monitor means (not shown) which serves to monitor the rate of gas flow within flash dryer 4 at feed inlet 4a. One exemplary monitor means would measure the pressure drop over cyclone 3, from which the rate of gas flow at feed inlet 4a would be calculated. Through the use of such a monitor means, the gas flow in flash dryer 4 can be preset never to fall below a minimum velocity at which all the feed into flash dryer 3 to remain in suspension, while maintaining a sufficient resident time within flash dryer 4 to ensure that the feed material is sufficiently dried. This velocity may be predetermined based on parameters such as the rate of feed into the dryer, the characteristics of the feed and the filter, and the likelihood of their being upset conditions with the filter or reduction in off gas flow from the lime kiln. With regard to the latter situation, the method of the present invention is adaptable to those times when the gas flow through the flash dryer is reduced, such as when the system is in start up or when the kiln is operating at less than full capacity. In such cases, a monitor will sense the reduced gas flow in the flash dryer and the damper means will be opened sufficiently to permit the amount of recycle gas in the flash dryer to be increased accordingly. A fan (not shown) may also be inserted in recycle line 20 if desired.

Lime sludge exiting flash dryer 4 at material discharge conduit 4c is, pursuant to the present invention, typically dried to less than 2% moisture content and is pneumatically fed to a separator means 3, e.g. a separator cyclone. The gases, along with product fines, dust and other impurities, are separated from the dried product in cyclone 3 and pass via conduit 30 to dust collector or baghouse 21. The bulk of the separated product from cyclone 3 is fed into rotary kiln 10, via feed conduit 40. As indicated previously, a portion of the separated, dried lime mud may be fed to optional mixer 2 as described above, which in the depicted embodiment is accomplished via conduit 50. Generally, a splitting gate is used to split the separated dried product between the two streams—the stream into the kiln and the stream into the mixer. In addition, separated product fines from baghouse 21 may optionally be recirculated via conduit 13 and mixed with fresh lime sludge, with conduit 14 being available to alternatively pass such fines off to product.

The dried lime sludge is calcined at temperatures ranging from about 1800° F. to about 2100° F. within the rotary kiln to a final calcined active lime.

It is intended that the foregoing be a description of a preferred embodiment and that the invention be limited solely by that which is within the scope of the appended claims.

What is claimed is:

1. A method of heat treating lime sludge (CaCO$_3$) to form burnt lime (CaO), comprising (a) introducing lime sludge feed via a feed material inlet to a flash dryer means, wherein said lime sludge is entrained in upwardly moving heated gases, with at least some of said gases being off gases from a lime reburning kiln that is in communication with said flash dryer, to thereby dry said lime sludge, and thereafter (b) introducing the gas entrained dried lime sludge to a separator means, wherein the dried lime sludge is separated from the gas and is thereafter fed to the lime kiln, wherein a portion of the separated gases is recycled to the flash dryer to thereby maintain the gas flow at the feed material inlet of the flash dryer at a velocity.

2. The method of claim 1 wherein the lime sludge introduced in step (a) has a moisture content that ranges from about 20% to about 30%.

3. The method of claim 1 wherein the lime sludge introduced into the flash dryer is a mixture of lime sludge feed and dried lime sludge, said dried lime sludge being a portion of the dried, separated lime sludge from said separator means which is recycled and mixed in a mixer means with said fresh sludge, with the mixture thereafter introduced to the flash dryer.

* * * * *